United States Patent Office 2,839,416
Patented June 17, 1958

2,839,416

ACID-PROOF WATER-GLASS CEMENTS CAPABLE OF SWELLING

Karl Dietz, Kronberg (Taunus), Germany, assignor to Farbwerke Hoechst Aktiengesellschaft vormals Meister Lucius & Bruning, Frankfurt am Main, Germany, a corporation of Germany No Drawing. Application October 26, 1955
Serial No. 543,019

Claims priority, application Germany November 2, 1954

8 Claims. (Cl. 106—84)

The present invention relates to the manufacture of acid-proof water-glass cements capable of swelling and a process of preparing them.

In the acid-resistant construction technique there are used for the tile lining of apparatus which are exposed to heat and pressure primarily such mortars as have a certain capability of swelling. During the expansion which the acid-proof tile lining and/or the steel shell undergoes on account of operational stresses; especially heat and pressure, the acid-proof mortar, owing to its capability of swelling, effects, more or less rapidly, an initial strength between the lining and the steel shell.

In the field of water-glass cements, which are used to a large extent in the acid-resistant construction technique, there existed up to now the difficulty of preparing cements capable of swelling which, at the same time, are resistant to all acids customarily used in industry.

Now, I have found that, by adding at least one metal compound of cyanamide, one can bring about a swelling of the water-glass cements and/or regulate same in a simple manner. These metal compounds, in which the hydrogen atoms of the cyanamide are replaced by metals, can without difficulty be admixed to all kinds of water-glass cements, either to mixed-up cement or, which is generally more expedient, to the cement powder or the water-glass. Under the influence of heat and especially of warm liquids, the cyanamides react with the alkali silicates which causes simultaneously a hardening and a swelling in the water-glass mortar. The hardened cement-work is acid-proof and shows a uniform expansion of volume, which has the aforesaid effects on the acid-proof tile linings.

As metal cyanamide compounds there are especially suited the compounds of bivalent metals, for example of lead, manganese, zinc, cadmium, and the compounds of earth alkaline metals, such as magnesium, calcium, strontium, and barium. These compounds are added to the water-glass cements in a quantity ranging suitably from about 0.1 to about 10 percent, calculated on the cement powder corresponding to about 0.25 to about 20 percent calculated on the water-glass. However, larger or smaller quantities may be added in individual cases. In this connection "cement powder" means the amount of all solid constituents. In order to carry out the process of the invention, all known water-glass cements may be employed containing, if desired, one or several additives of hardening effect such as silico fluorides, acid amides such as formamide, oxamide, triacetamide, malonamide, esters such as glycolide, oxalic acid dimethylester, glycol diformate, glycerin triformate, acid anhydrides such as succinic acid anhydride, maleic acid anhydride, sulfochlorides such as paratoluene-sulfochloride etc. or metal oxides such as lead oxide or zinc oxide. Furthermore known fillers may be added such as quartz, kaolin, kieselguhr, glass powder, porcelain powder, chamotte powder, stoneware powder, graphite including coke powder, silicon, silicon carbide, etc., alone or in mixtures. Water-glass cements containing the alkali silicate in the form of powder in the cement powder are also well-suited. Potassium or sodium water-glasses or their mixtures may be used as water-glasses.

It has already been described that lead cyanamide increases the swelling of linseed oil containing paints on objects under water. From this fact, however, it could not be deduced that cyanamides are suited for regulating the swelling of water-glass cements, all the more so since paints and water-glass cements are totally different from one another as regards their hardening mechanism. Drying oil containing paints dry by absorption of oxygen from the air, whereas water-glass cements, owing to their entirely different composition, harden by totally different reactions and, moreover, differ completely from oil-containing paints both in their composition and in their physical structure.

The following examples serve to illustrate the invention but they are not intended to limit it thereto, the parts being by weight:

*Example 1*

100 parts of a cement powder consisting of 2 parts of formamide
    0.5 parts of lead cyanamide
    2.5 parts of kieselguhr
    95 parts of quartz powder are mixed up with 40 to 50 grams of sodium water-glass solution of the molecular proportion of $SiO_2$ to $Na_2O = 2.65$ and a specific weight of 1.50. The cement mix hardens after 24 hours and shows a swelling of 0.6 percent when being boiled in a calcium bisulfite lye after having been stored in the open air for eight days.

*Example 2*

100 parts of a cement powder consisting of 5 parts of calcium cyanamide
    4 parts of kaolin, and
    92 parts of quartz powder are mixed up with 40 to 50 parts of potassium water-glass solution of the molecular proportion of $SiO_2$ to $K_2O = 1.88$ and a specific weight of 1.42. The cement mix hardens within 24 hours of its own and shows a swelling of 0.5 percent when being boiled in sulfuric acid of 10 percent strength after having been stored for eight days in the open air. Instead of calcium cyanamide small quantities of barium cyanamide may be used; for example instead of 5 parts of calcium cyanamide a mixture of 4.5 parts of calcium cyanamide and 0.5 part of barium cyanamide may be used in the above cement powder.

I claim:

1. Alkali water-glass compositions capable of swelling and consisting essentially of alkali water-glass and at least one cyanamide of a bivalent metal in an amount ranging from 0.1 to 10 percent, calculated on the weight of the solid components of said compositions.

2. Compositions as claimed in claim 1, containing lead cyanamide.

3. Alkali water-glass compositions capable of swelling and consisting essentially of alkali water-glass and at least one cyanamide of a bivalent metal in an amount ranging from 0.1 to 10 percent, calculated on the weight of the solid components of said compositions, and at least one reactive hardener.

4. Alkali water-glass compositions capable of swelling and consisting essentially of a compound selected from the group consisting of sodium water-glass, potassium water-glass and mixtures thereof, at least one cyanamide of a bivalent metal in an amount ranging from 0.1 to 10 percent calculated on the weight of the solid components of said compositions, solid inorganic inert filling material and at least one reactive hardener.

5. Alkali water glass cements capable of swelling and consisting essentially of a compound selected from the group consisting of sodium water glass, potassium water glass and mixtures thereof, and at least one cyanamide of a bivalent metal in an amount ranging from 0.1 to 10 percent calculated on the weight of the solid components of said compositions.

6. Cementitious compositions capable of swelling and consisting essentially of a compound selected from the group consisting of sodium water-glass, potassium water-glass and mixtures thereof, a solid inorganic inert filling material and a cyanamide of a bivalent metal in an amount ranging from 0.1 to 10 percent calculated on the weight of the solid components of said compositions.

7. Cementitious compositions capable of swelling and consisting essentially of a compound selected from the group consisting of sodium water-glass, potassium water-glass and mixtures thereof, a solid inorganic inert filling material, a cyanamide of a bivalent metal in an amount ranging from 0.1 to 10 percent calculated on the weight of the solid components of said compositions, and formamide.

8. Cementitious compositions as in claim 3 and further including a hardening agent selected from the group consisting of silico fluorides, acid amides, dibasic acid anhydrides, sulfochlorides, metal oxides selected from the group consisting of lead and zinc oxides and esters selected from the group consisting of glycolide, oxalic acid dimethylester, glycol diformate and glycerin triformate.

References Cited in the file of this patent

UNITED STATES PATENTS 2,449,346     Vannoy  ---------------- Sept. 14, 1948

FOREIGN PATENTS 464,638     Great Britain ----------- Apr. 21, 1937